United States Patent
Liao et al.

(10) Patent No.: US 11,830,683 B2
(45) Date of Patent: Nov. 28, 2023

(54) KEY STRUCTURE

(71) Applicants: LITE-ON ELECTRONICS (GUANGZHOU) LIMITED, Guangzhou (CN); LITE-ON TECHNOLOGY CORPORATION, Taipei (TW)

(72) Inventors: Cheng-Kun Liao, Taipei (TW); En-Huei Wang, Taipei (TW); Ming-Fu Yen, Taipei (TW)

(73) Assignees: LITE-ON ELECTRONICS (GUANGZHOU) LIMITED, Guangzhou (CN); LITE-ON TECHNOLOGY CORPORATION, Taipei (TW)

(*) Notice: Subject to any disclaimer, the term of this patent is extended or adjusted under 35 U.S.C. 154(b) by 0 days.

(21) Appl. No.: 17/139,595

(22) Filed: Dec. 31, 2020

(65) Prior Publication Data

US 2021/0210291 A1    Jul. 8, 2021

Related U.S. Application Data

(60) Provisional application No. 62/956,362, filed on Jan. 2, 2020.

(30) Foreign Application Priority Data

Nov. 26, 2020    (CN) .......................... 202011351794.8

(51) Int. Cl.
*H01H 13/10*    (2006.01)
*H01H 13/14*    (2006.01)
(Continued)

(52) U.S. Cl.
CPC ........... *H01H 13/10* (2013.01); *G06F 3/0219* (2013.01); *H01H 13/14* (2013.01); *H01H 13/52* (2013.01); *H01H 13/7073* (2013.01)

(58) Field of Classification Search
CPC ........ H01H 13/10; H01H 13/14; H01H 13/52; H01H 13/7073; H01H 13/023;
(Continued)

(56) References Cited

U.S. PATENT DOCUMENTS 6,140,595 A * 10/2000 Yao ......................... H01H 3/125
                                              200/341
10,867,759 B2 * 12/2020 Chao ...................... H01H 3/125
(Continued)

FOREIGN PATENT DOCUMENTS

CN    2377598 Y    5/2000
CN    2379972 Y    5/2000
(Continued)

OTHER PUBLICATIONS

Chinese Office Action corresponding to Application No. 202011351794.8 and dated Aug. 9, 2022, 17 pages.
(Continued)

*Primary Examiner* — Lheiren Mae A Caroc
(74) *Attorney, Agent, or Firm* — Innovation Counsel LLP

(57) ABSTRACT

A key structure is provided. The key structure includes a base plate, a keycap, a positioning element and a rod. The base plate has a through hole. The positioning element is engaged with the through hole. A projection area of the positioning element on the base plate along a lifting direction of the keycap is larger than an area of the through hole.

22 Claims, 11 Drawing Sheets

(51) Int. Cl.
 *H01H 13/52* (2006.01)
 *H01H 13/7073* (2006.01)
 *G06F 3/02* (2006.01)

(58) Field of Classification Search
 CPC .............. H01H 13/83; H01H 2219/064; G06F 3/0219; G06F 3/02
 See application file for complete search history.

(56) References Cited

U.S. PATENT DOCUMENTS 11,011,328 B2 * 5/2021 Chuang .................. H01H 13/10
11,081,298 B2 * 8/2021 Cheng .................... H01H 13/88

FOREIGN PATENT DOCUMENTS

| CN | 204332773 U | 5/2015 |
| CN | 105719875 A | 6/2016 |
| CN | 206931507 U | 1/2018 |
| CN | 109767946 A | 5/2019 |
| CN | 110444431 A | 11/2019 |

OTHER PUBLICATIONS

Chinese Office Action corresponding to Application No. 202011351794.8 and dated Jul. 14, 2023, 20 pages.

* cited by examiner

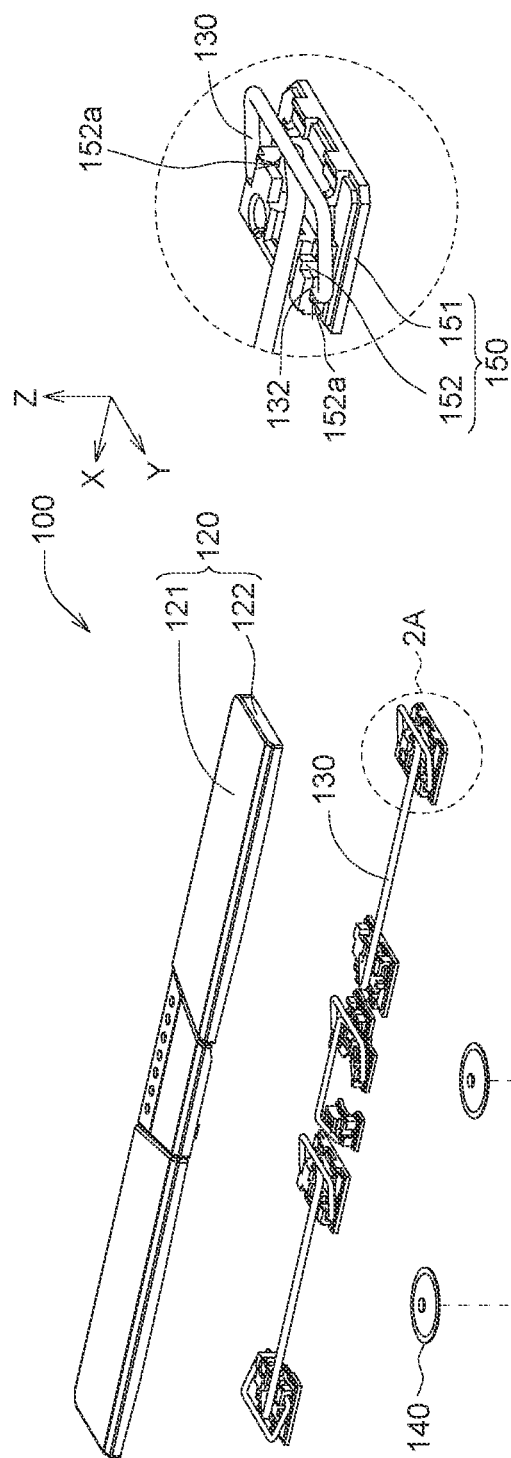
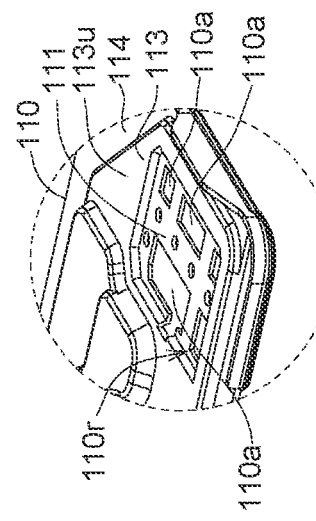
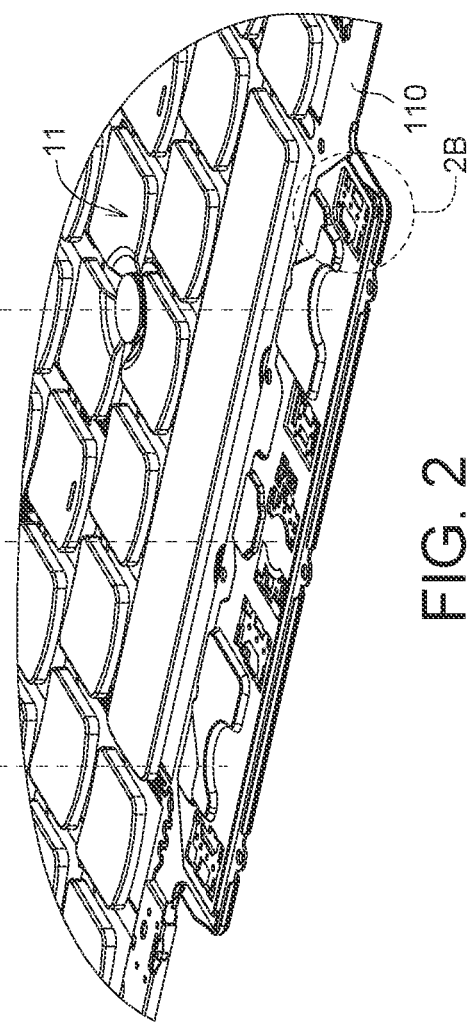
FIG. 2A
FIG. 2B
FIG. 2

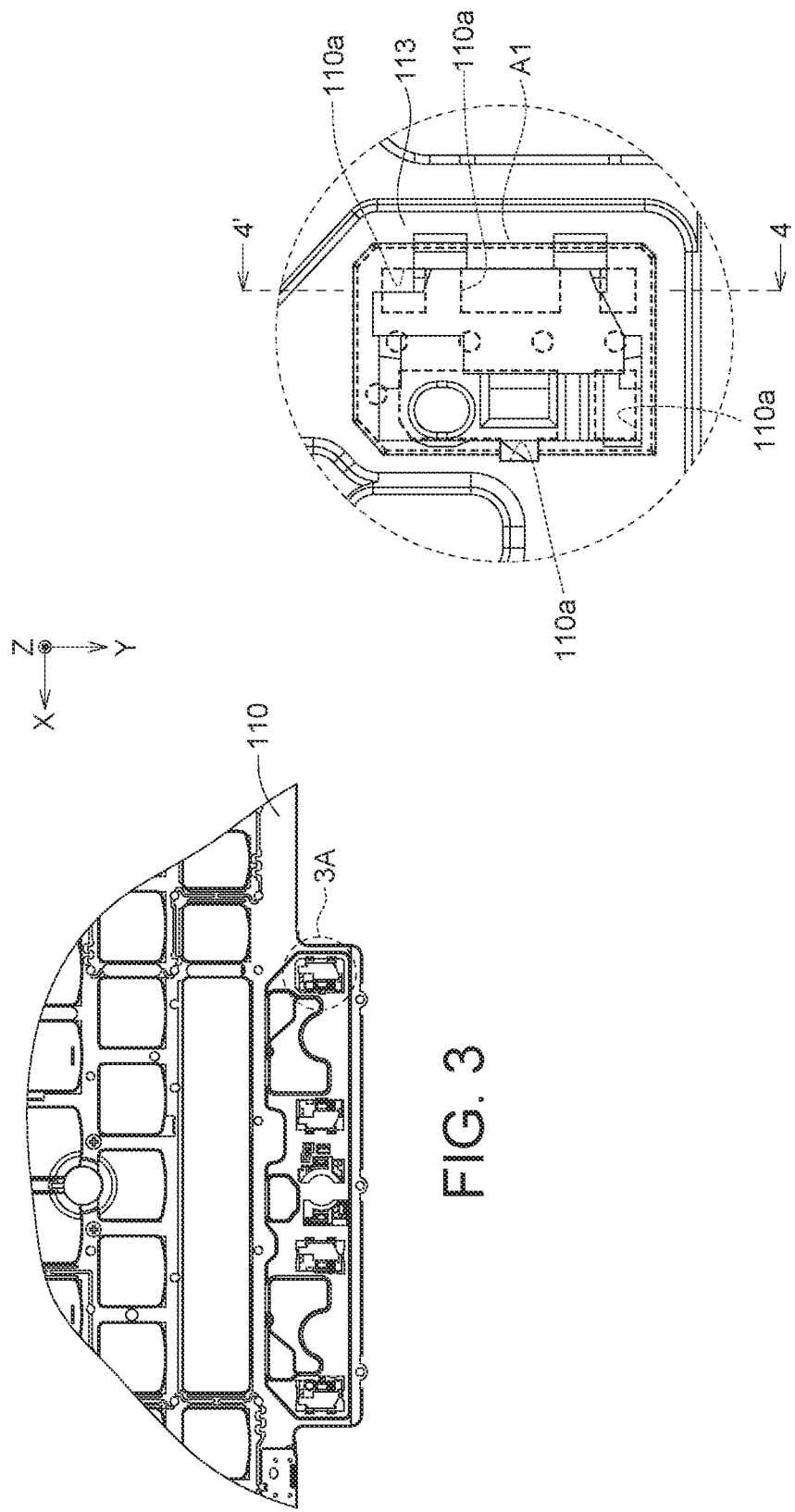

KEY STRUCTURE

This application claims the benefit of U.S. Provisional application Ser. No. 62/956,362, filed Jan. 2, 2020, the disclosure of which is incorporated by reference herein in its entirety, and claims the benefit of People's Republic of China application Serial No. 202011351794.8, filed on Nov. 26, 2020, the subject matter of which is incorporated herein by reference.

FIELD OF THE INVENTION

The invention relates to a key structure, and more particularly to a key structure having a positioning element.

BACKGROUND OF THE INVENTION

Keyboards have become indispensable input devices for computers. Especially, in order to make a lighter or more compact computer without compromise on its lifetime, keyboard manufacturers need to develop a thin and durable key structure. A conventional key structure often adopts positioning hooks that are formed by stamping a base plate to hold a support structure under a keycap. When a user keeps typing on the key structure, the positioning hooks are constantly impacted or pulled by the support structure. The positioning hooks are likely to break down or break away from the base plate, thus causing the support structure to be unstable and further affecting the reliability and the lifetime of the key structure.

SUMMARY OF THE INVENTION

The present invention is to provide a key structure with improved connecting strength and reliability.

In one embodiment of the invention, a key structure is provided. The key structure includes a base plate, a keycap, a positioning element and a rod. The base plate has a through hole. The positioning element is engaged with the through hole. A projection area of the positioning element on the base plate along a lifting direction of the keycap is larger than an area of the through hole.

In another embodiment of the invention, a key structure is provided. The key structure includes a base plate, a keycap, a positioning element and a rod. The base plate includes an engagement interface and a first position-limited portion, the first position-limited portion extends from a first edge of the engagement interface toward a middle portion of the engagement interface. The positioning element is engaged with the engagement interface. The rod connects the positioning element and the keycap.

Numerous objects, features and advantages of the invention will be readily apparent upon a reading of the following detailed description of embodiments of the invention when taken in conjunction with the accompanying drawings. However, the drawings employed herein are for the purpose of descriptions and should not be regarded as limiting.

BRIEF DESCRIPTION OF THE DRAWINGS

The above objects and advantages of the invention will become more readily apparent to those ordinarily skilled in the art after reviewing the following detailed description and accompanying drawings, in which:

FIG. 2 shows an exploded view of the key structure (pointing module not shown) of FIG. 1;

FIG. 2A shows a partial enlarged view of the encircled part 2A of the structure of FIG. 2;

FIG. 2B shows a partial enlarged view of the encircled part 2B of the structure of FIG. 2;

FIG. 3 shows a top view of the base plate and the positioning element;

FIG. 3A shows a partial enlarged view of the encircled part 3A of the structure of FIG. 3;

FIG. 5A shows a partial enlarged view of the encircled part 5A of the structure of FIG. 5;

FIG. 6A shows a partial enlarged view of the encircled part 6A of the structure of FIG. 6;

FIG. 7A shows a partial enlarged view of the encircled part 7A of the structure of FIG. 7;

FIG. 8A shows a partial enlarged view of the encircled part 8A of the structure of FIG. 8;

DETAILED DESCRIPTION OF PREFERRED EMBODIMENTS

Figure 1:
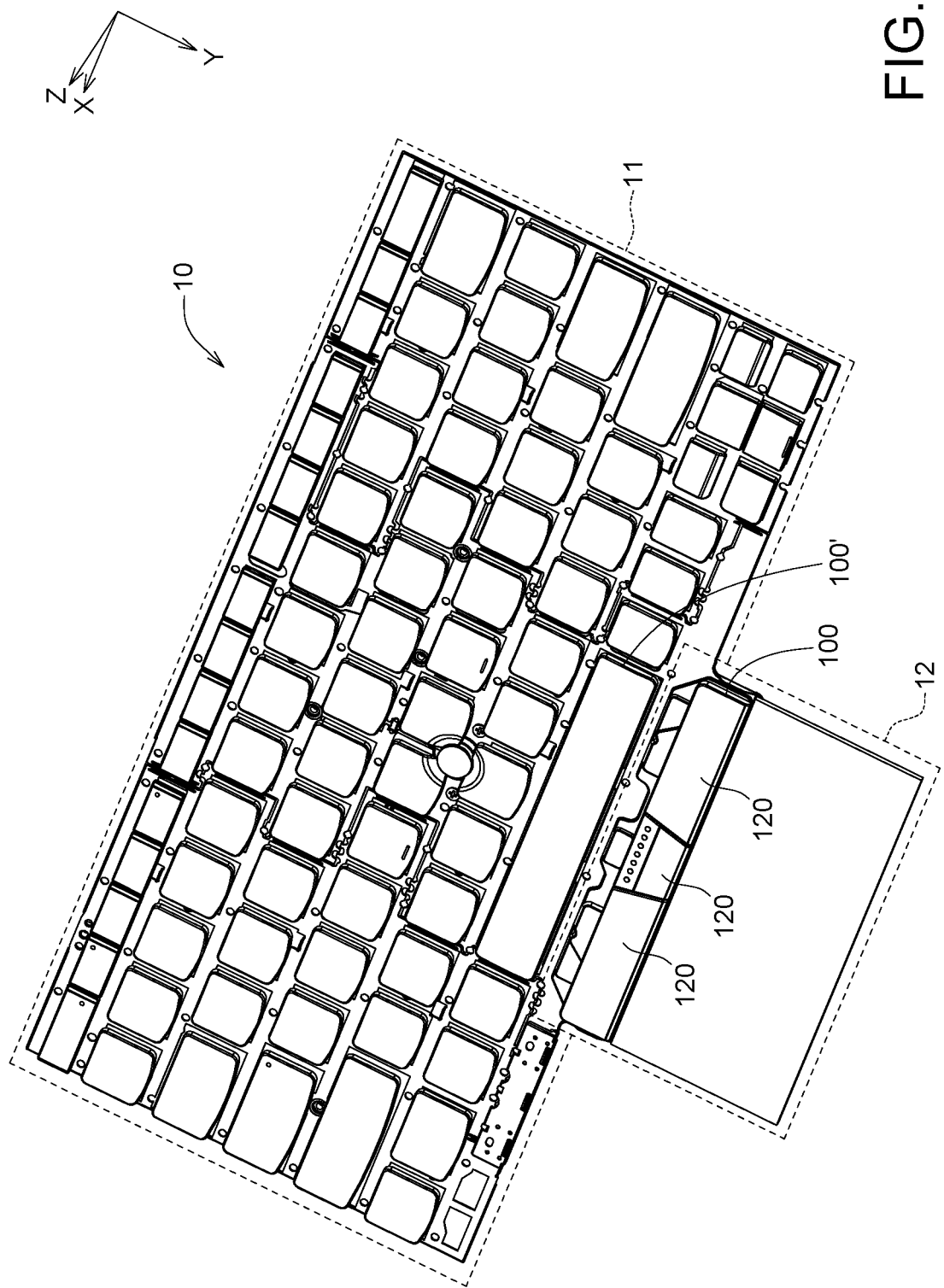
FIG. 1 shows a schematic diagram of an electronic device according to an embodiment of the present invention.

FIG. 1 shows a schematic diagram of an electronic device 10 according to an embodiment of the present invention. The electronic device 10 is, for example, a host of a notebook computer, but it could also be home appliance or other electronic device that requires an input function. In the present embodiment, the electronic device 10 is the host of a notebook computer, for example. The electronic device 10 includes a keyboard module 11, and a pointing module 12 which could be a touchpad or trackpad. In the present embodiment, the key structure 100 is a click key of the pointing module 12, for example. In another embodiment, depending on the type of the electronic device 10, the electronic device 10 can omit one of the keyboard module 11 and the pointing module 12.

FIG. 2 shows an exploded view of the key structure 100 of FIG. 1, FIG. 2A shows a partial enlarged view of the encircled part 2A of the key structure 100 of FIG. 2, and FIG. 2B shows a partial enlarged view of the encircled part 2B of the key structure 100 of FIG. 2. The key structure 100 includes a base plate 110, at least one keycap 120, at least one rod 130, at least one restoration member 140 and at least one positioning element 150. The base plate 110 has at least one through hole 110a. The positioning element 150 is engaged with the through hole 110a. The rod 130 is movably connected to the positioning element 150 and the keycap 120. In this embodiment, one side of the rod 130 is rotatably or pivotally connected to the base plate 110, while the other side is rotatably or pivotally connected to the keycap 120, such that the keycap 120 could move up and down relative to the base plate 110 in a specific direction, e.g., a lifting direction Z. In the present embodiment, the keyboard module 11 and the key structure 100 share the same base plate 110.

FIG. 3 shows a top view of the base plate 110 and the positioning element 150, and FIG. 3A shows a partial enlarged view of the encircled part 3a of the structure of FIG. 3. A projected area A1 of the positioning element 150 (shown in FIG. 2A) on the base plate 110 along the lifting direction Z of the keycap 120 (the projected area A1 is shown in FIG. 3A) is larger than an area of the through hole 110a. Due to the positioning element 150 being engaged with the through hole 110a (drawn in thick lines in FIG. 3A), a relative position between the positioning element 150 and the base plate 110 could be fixed, and the positioning element 150 could be prevented from being easily separated from the base plate 110.

Figure 3B:
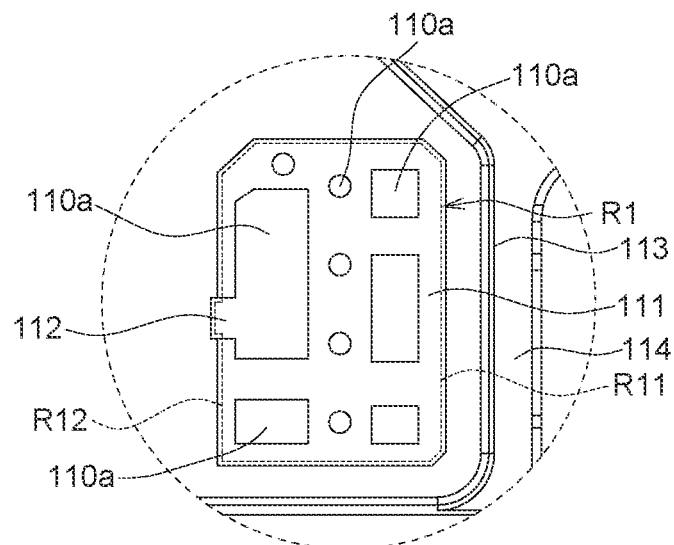
FIG. 3B shows a partial top view of the base plate of FIG. 3.

FIG. 3B shows a partial top view of the base plate 110 of FIG. 3. The base plate 110 further includes at least one engagement interface R1 and at least one first position-limited portion 111, wherein the engagement interface R1 is the region which is engaged with or covered by the positioning element 150 (shown in the FIG. 2A). The first position-limited portion 111 could extend from a first edge R11 of the engagement interface R1 toward a middle portion of the engagement interface R1. In an embodiment, the base plate 110 further includes at least one second position-limited portion 112, and the second position-limited portion 112 extends from a second edge R12 of the engagement interface R1 away from the middle portion of the engagement interface R1. The first edge R11 could be one or some of the edges of the engagement interface R1, and the second edge R12 could be another one or others of the edges of the engagement interface R1. In the present embodiment, the first position-limited portion 111 is a physical material of the base plate 110 (shown in FIG. 3), and the second position-limited portion 112 is a notch.

Figure 4:
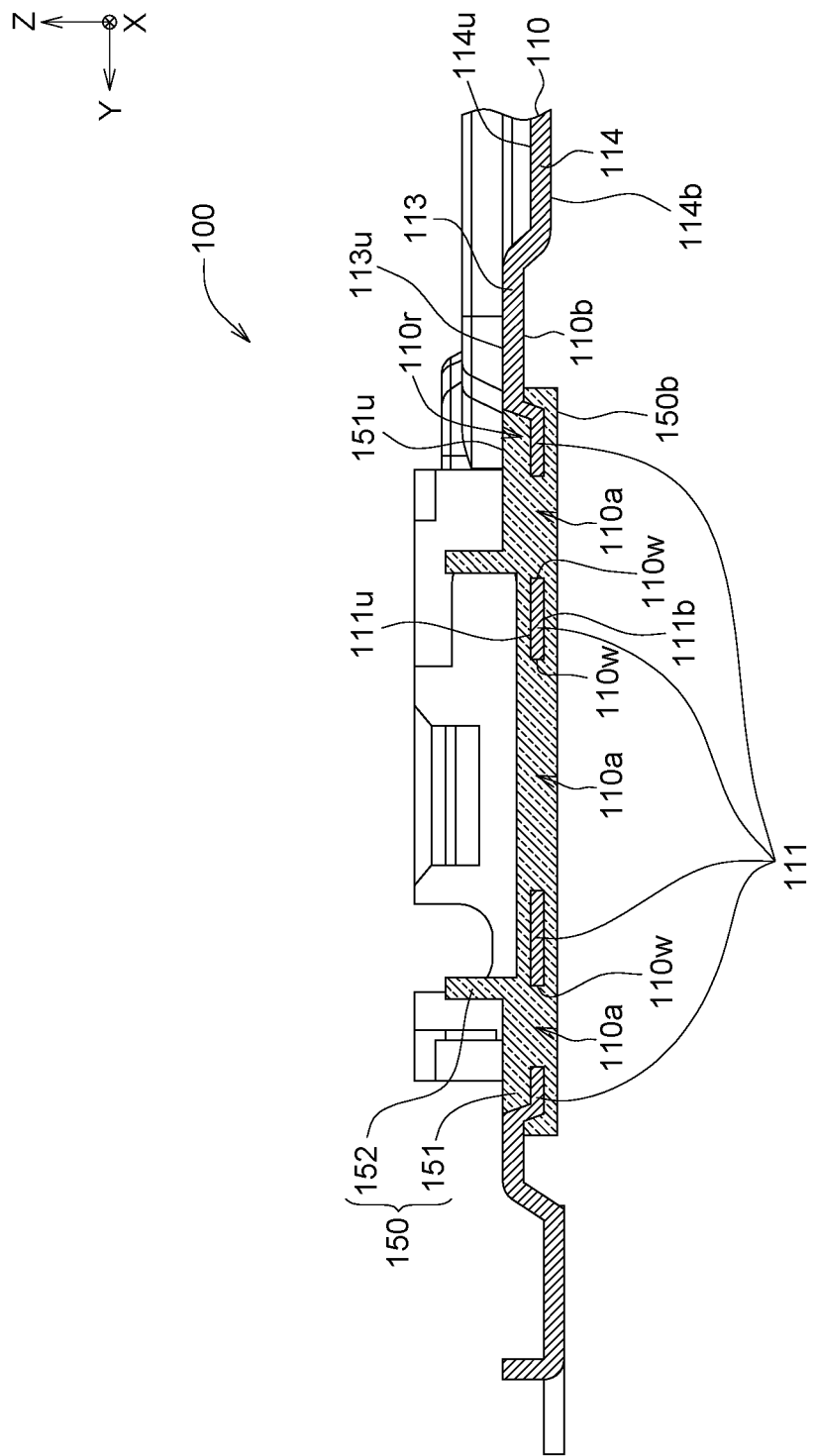
FIG. 4 shows a cross-sectional view of the base plate and the positioning element of FIG. 3A along a direction 4-4'.

FIG. 4 shows a cross-sectional view of the base plate 110 and the positioning element 150 of FIG. 3A along a direction 4-4'. As shown in FIGS. 3B and 4, the first position-limited portion 111 and the engagement interface R1 are located on different horizontal planes (or levels). For example, the first position-limited portion 111 and the edge of the engagement interface R1 (for example, the first edge R11) are located on different horizontal planes (or levels).

As shown in FIGS. 2, 2A, 2B, 3, 3A, 3B and 4, the number of through holes 110a of the base plate 110 is multiple, and the through holes 110a are formed in the first position-limited portion 111. That is, the first position-limited portion 111 separates the through holes 110a. The positioning element 150 covers or encapsulates at least one portion of the first position-limited portion 111. The positioning element 150, for example, fills the through holes 110a, and therefore, the through holes 110a could be communicated via the physical material of the positioning element 150. As a result, a relative displacement between the positioning element 150 and the base plate 110 could be restricted.

For example, the physical material of the positioning element 150 covers a sidewall 110w of the through hole 110a, and thus the relative displacement of the positioning element 150 and the base plate 110 along the XY plane could be restricted. The direction of the XY plane shown in the figure is substantially perpendicular to the lifting direction Z. In an embodiment, the physical material of the positioning element 150 covers an upper surface 111u and a lower surface 111b of the first position-limited portion 111, and thus the relative displacement of the positioning element 150 and the base plate 110 along the lifting direction Z could be restricted.

Due to the arrangement of the through hole 110a of the base plate 110, the relative displacement of the positioning element 150 and the base plate 110 along the X, Y, and Z directions could be restricted.

In addition, as shown in FIGS. 2B and 3B, the shape of any of the through holes 110a could be a circle or a polygon, and the polygon is, for example, a square or a rectangle. In addition, the shape of any of the through holes 110a could also be an ellipse or a geometric shape composed of a curved line, a straight line or a combination thereof. In addition, the embodiment of the present invention does not limit the number of the through holes 110a, which may be one or more. In terms of manufacturing process, the through hole 110a could be formed on the base plate 110 by using, for example, a sheet metal forming process, a stamping process, a punching process or a cutting process.

As shown in FIGS. 2, 2B, 3B and 4, the base plate 110 is, for example, a metal plate, and several portions of the base plate 110 could have substantially the same thickness. The base plate 110 includes a mounting area 113 having a second upper surface 113u and a lower surface 110b opposite to each other. The base plate 110 has a recess 110r that downward extends to the first position-limited portion 111 from the second upper surface 113u of the mounting area 113. In the present embodiment, the recess 110r is, for example, an indentation of the base plate 110, such as an indentation connected to the mounting area 113. The first position-limited portion 111 could be a bottom of the recess 110r or a portion of the base plate 110. The through hole 110a extends to the lower surface 111b from the upper surface 111u of the first position-limited portion 111, that is, the through hole 110s penetrates the first position-limited portion 111. In terms of manufacturing process, the shape of the mounting area 113 or the recess 110r could be formed by stamping using a mold or stamping press (not shown). For example, the shape of the base plate 110 could be formed by using a sheet metal forming process and/or a stamping process for a base plate material (not shown), and the through holes 110a could be formed at the same time, or the through holes 110a could be further formed in different processes, such as punching process or other metalworking processes.

Figure 3C:
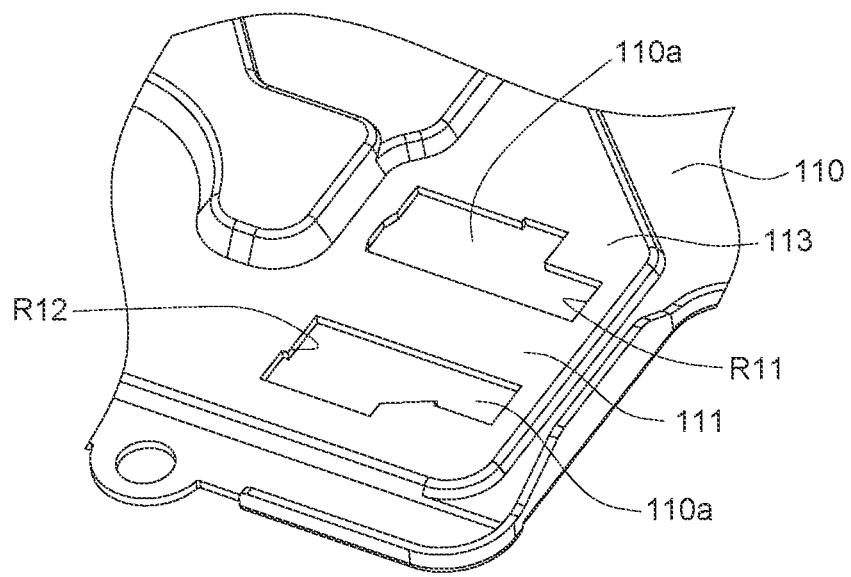
FIG. 3C shows a schematic partial top view of the base plate according to another embodiment.
Figure 3D:
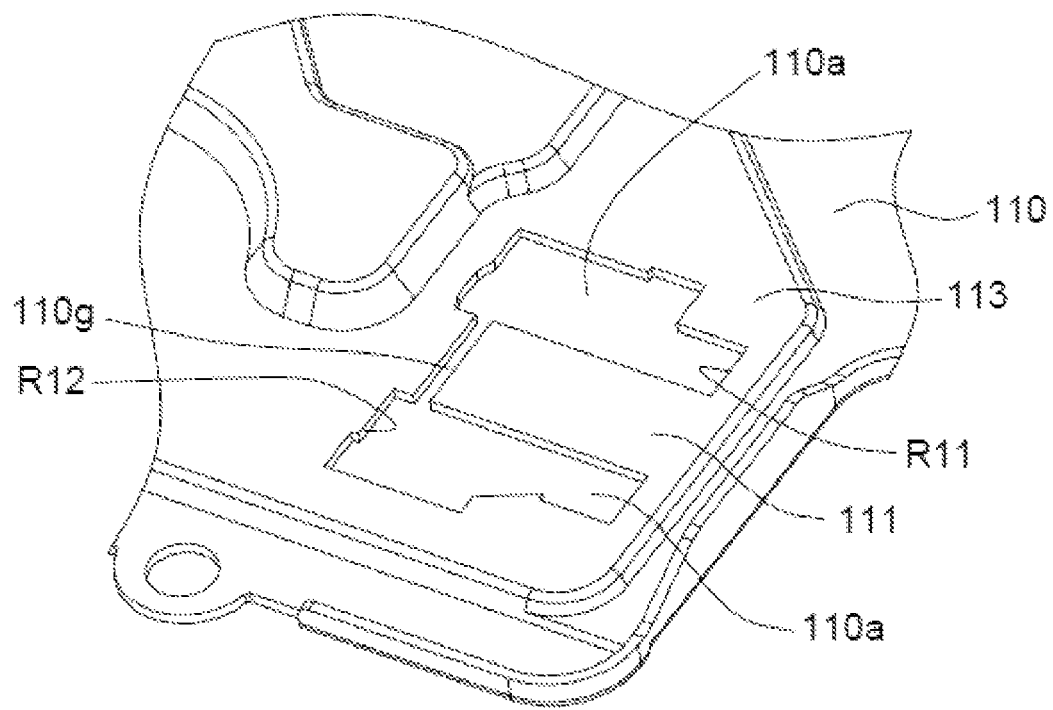
FIG. 3D shows a schematic partial top view of the base plate according to another embodiment.

In another embodiment, the recess 110r is not included in the base plate 110. In this case, the upper surface 111u of the first position-limited portion 111 and the second upper surface 113u of the mounting area 113 are substantially coplanar, that is, on the same horizontal plane (or level). The through hole 110a could extend to the lower surface 110b from the second upper surface 113u of the mounting area 113. FIG. 3C shows a schematic partial top view of the base plate 110 according to another embodiment. The first position-limited portion 111 is arranged in the mounting area 113 of the base plate 110 with two through holes 110a penetrating the base plate 110. The material of the positioning element could fill the through holes 110a, and cover or encapsulate the first position-limited portion 111 as well. As shown in FIG. 3C, the first position-limited portion 111 could extend to the second edge R12 from the first edge R11, and the two through holes 110a are divided by the position-limited portion 111. It is noted that the first position-limited portion 111 shown in FIG. 3C could have another contour. In some embodiments, the first position-limited portion 111 extending from the first edge R11 might not touch the opposite second edge R12 (as shown in FIG. 3D), or the first position-limited portion 111 extending from the second edge R12 might not touch the first edge R11; that is, the first position-limited portion 111 could be a protuberance or rib protruding from the first edge R11 or the second edge R12 with a gap (e.g. the gap 110g shown in FIG. 3D) between one end thereof and the second edge R12. Therefore, the two through holes 110a shown in FIG. 3C would be communicated with each other through the gap, thereby merging into a single hole with the first position-limited portion 111 protruding from one of the edges of the hole.

As shown in FIGS. 2, 2B, 3B and 4, the base plate 110 further has a peripheral area 114. The mounting area 113 protrudes from an upper surface 114u of the peripheral area 114. The keycap 120 (shown in FIG. 1) is located on the mounting area 113 and exposes the peripheral area 114, and the positioning element 150 is engaged with the mounting area 113 of the base plate 110. The bottom 150b of the positioning element 150 could be substantially aligned with the lower surface 114b of the peripheral area 114. In another embodiment, the bottom 150b of the positioning element 150 might protrude from the lower surface 114b of the peripheral area 114.

As shown in FIG. 1, as the key structure 100 is applied to the pointing module 12 of the electronic device 10 (for example, the host of the computer), the keycap 120, the positioning element 150 and the rod 130 are disposed adjacent to a side of the keyboard module 11, for example, the lower side (the side close to the user) of the keyboard module 11. In the present embodiment, the key structure 100 is located between the keyboard module 11 and the pointing module 12, and the length and width of the key structure 100 are substantially different, for example.

As shown in FIGS. 2 and 2B, the restoration member 140 is disposed between the base plate 110 and the keycap 120. In addition, the restoration member 140 could be located between two adjacent positioning elements 150. When the keycap 120 is pressed and moves toward the base plate 110, the restoration member 140 is squeezed to be deformed, and the deformed restoration member 140 stores an elastic potential energy. When the keycap 120 is released, the restoration member 140 releases the elastic potential energy to drive the keycap 120 to return to an initial position (for example, restoration). In terms of material, the restoration member 140 is made of metal or rubber material, for example. In addition, the key structure 100 further includes a membrane switch layer (not shown) which is disposed between the restoration member 140 and the base plate 110. The membrane switch layer includes a first insulation layer, a spacer layer, and a second insulation layer. The spacer layer is disposed between the first insulation layer and the second insulation layer. A first conductive pad and a second conductive pad could be disposed on the first insulation layer and the second insulation layer respectively. When the restoration member 140 presses against the membrane switch layer, the first conductive pad and the second conductive pad are in contact and accordingly output a trigger signal (not shown) to a controller (not shown) for executing the corresponding function according to the trigger signal.

As shown in FIG. 4, the physical material of the positioning element 150 fills the recess 110r of the base plate 110, and it could increase the contact area between the physical material of the positioning element 150 and the recess 110r, thereby enhancing the connecting strength between the positioning element 150 and the base plate 110. The positioning element 150 includes a base 151 and a positioning part 152, wherein at least one portion of the base 151 fills the recess 110r, and the positioning part 152 is connected to the base 151 and protrudes relative to the second upper surface 113u of the mounting area 113.

In addition, as shown in FIG. 2A, the positioning part 152 has a plurality of positioning holes 152a, and the rod 130 is pivotally or movably connected to the positioning holes 152a. In an embodiment, the rod 130 and the positioning hole 152a are loosely fitted. When the rod 130 moves with respect to the positioning hole 152a (for example, the keycap 120 moves up and down to drive the rod 130 to move), the rod 130 would inevitably pull or hit the positioning element 150. Due to the design of the through hole 110a, the positioning element 150 could be firmly combined with the base plate 110, and thus the positioning element 150 could be prevented from being detached from the base plate 110.

As shown in FIG. 4, the base 151 has a first upper surface 151u, and the first upper surface 151u is not lower than the second upper surface 113u of the mounting area 113. As a result, the rod 130 could be prevented from interfering with the base plate 110, thereby preventing the rod 130 and the base plate 110 from interfering with each other and being wearing during the movement of the rod 130 relative to the positioning element 150. In the present embodiment, as shown in FIG. 4, the first upper surface 151u and the second upper surface 113u are substantially aligned with each other, for example, flush with each other.

In addition, in terms of structure, the base 151 and the positioning part 152 are integrally formed as one piece. In terms of material, the material of the positioning element 150 is different from that of the base plate 110. For example, the base 151 and/or the positioning part 152 are made of plastic, and the base plate 110 is made of metal. In terms of manufacturing process, the positioning element 150 could be formed in the base plate 110 by insert molding, overmolding, or injection molding.

Figure 5:
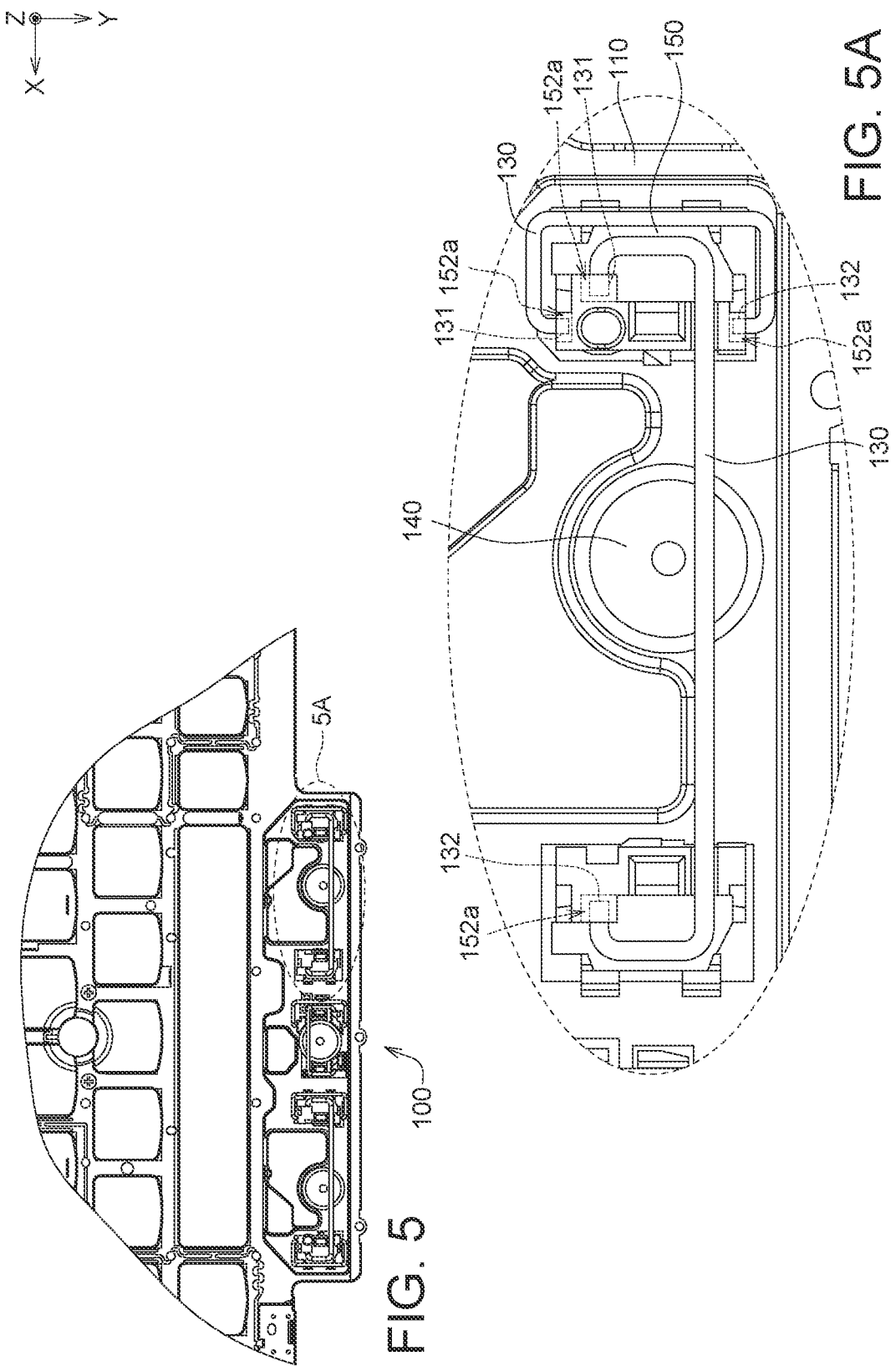
FIG. 5 shows a top view of the base plate, the rod and the positioning element of the key structure of FIG. 1.
Figure 6:
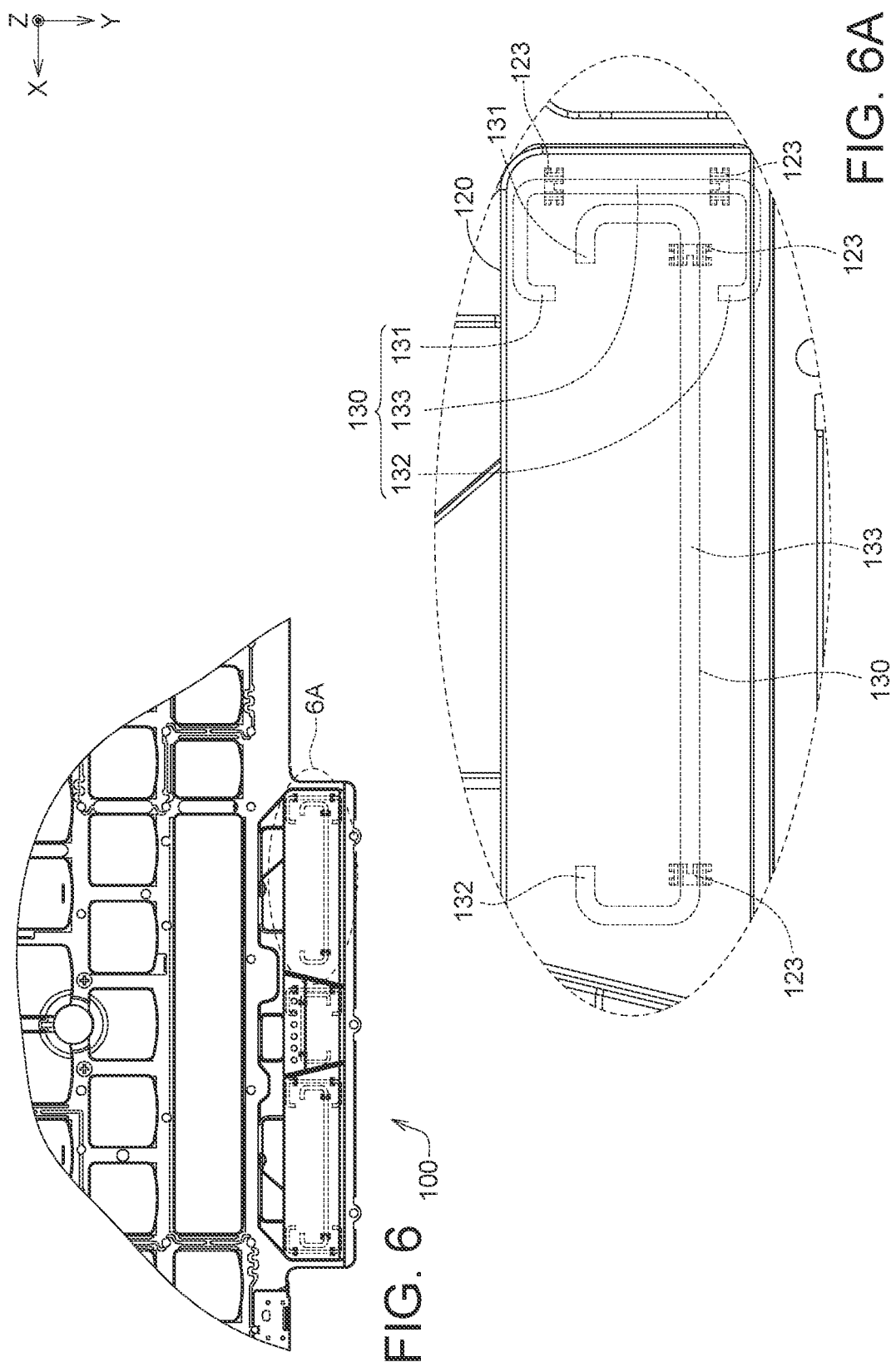
FIG. 6 shows a partial perspective view of the key structure (including the keycap) of FIG. 5.

FIG. 5 shows a top view of the base plate 110, the rod 130 and the positioning element 150 of the key structure 100 of FIG. 1, FIG. 5A shows a partial enlarged view of the encircled part 5A of the structure of FIG. 5, FIG. 6 shows a partial perspective view of the key structure 100 (including the keycap 120) of FIG. 5, and FIG. 6A shows a partial enlarged view of the encircled part 6A of the structure of FIG. 6.

The keycap 120 includes a top plate 121, a side skirt 122 connected to the top plate 121 and at least one pivot part 123. The pivot part 123 is disposed on a lower surface (or bottom surface) of the top plate 121. In the present embodiment, the top plate 121, the side skirt 122 and the pivot part 123 are, for example, integrally formed as one piece. In terms of material, the top plate 121, the side skirt 122 and/or the pivot part 123 are made of plastic material, for example.

The rod 130 is pivotally or movably connected to the keycap 120 and the positioning element 150. The rod 130 is, for example, pivotally connected to the pivot part 123 of the keycap 120 and the positioning part 152 of the positioning element 150. In the present embodiment, the keycap 120 and the positioning element 150 are movably connected through the structural rod 130, rather than a lifting mechanism. The lifting mechanism is, for example, a scissor-like mechanism. The rod 130 is formed, for example, by using a bending process on a metal material. The rod 130 has, for example, at least one bending portion with a "U" shape, an "L" shape, an "S" shape, or various appropriate curved shapes that may facilitate the engagement between the rod 130 and the positioning element 150. The cross-sectional shape of the rod 130 is, for example, a circle or a polygon, such as a square or a rectangle. The cross-sectional shape of the rod 130 along an extending direction of the rod 130 is, for example, the same or similar, that is, the cross-sectional shape of the rod 130 is substantially unchanged along the extending direction of the rod 130. The rod 130 includes a first end 131 and a second end 132 opposite to each other, and a rod body 133 between the first end 131 and the second end 132, wherein the first end 131 and the second end 132 are pivotally connected to the positioning element 150, for example, respectively connected to two positioning holes 152a of the positioning element 150, and the rod body 133 could be pivotally connected to the pivot part 123 of the keycap 120.

In some embodiments, the keycap 120 could float with respect to the base plate 110, and the keycap 120 is pivotally connected to the positioning element 150 through the rod 130, so that the entire keycap 120 could be substantially straight move up and down along the lifting direction Z, instead of one side of the keycap 120 rotating relative to the other side of the keycap 120.

Figure 7:
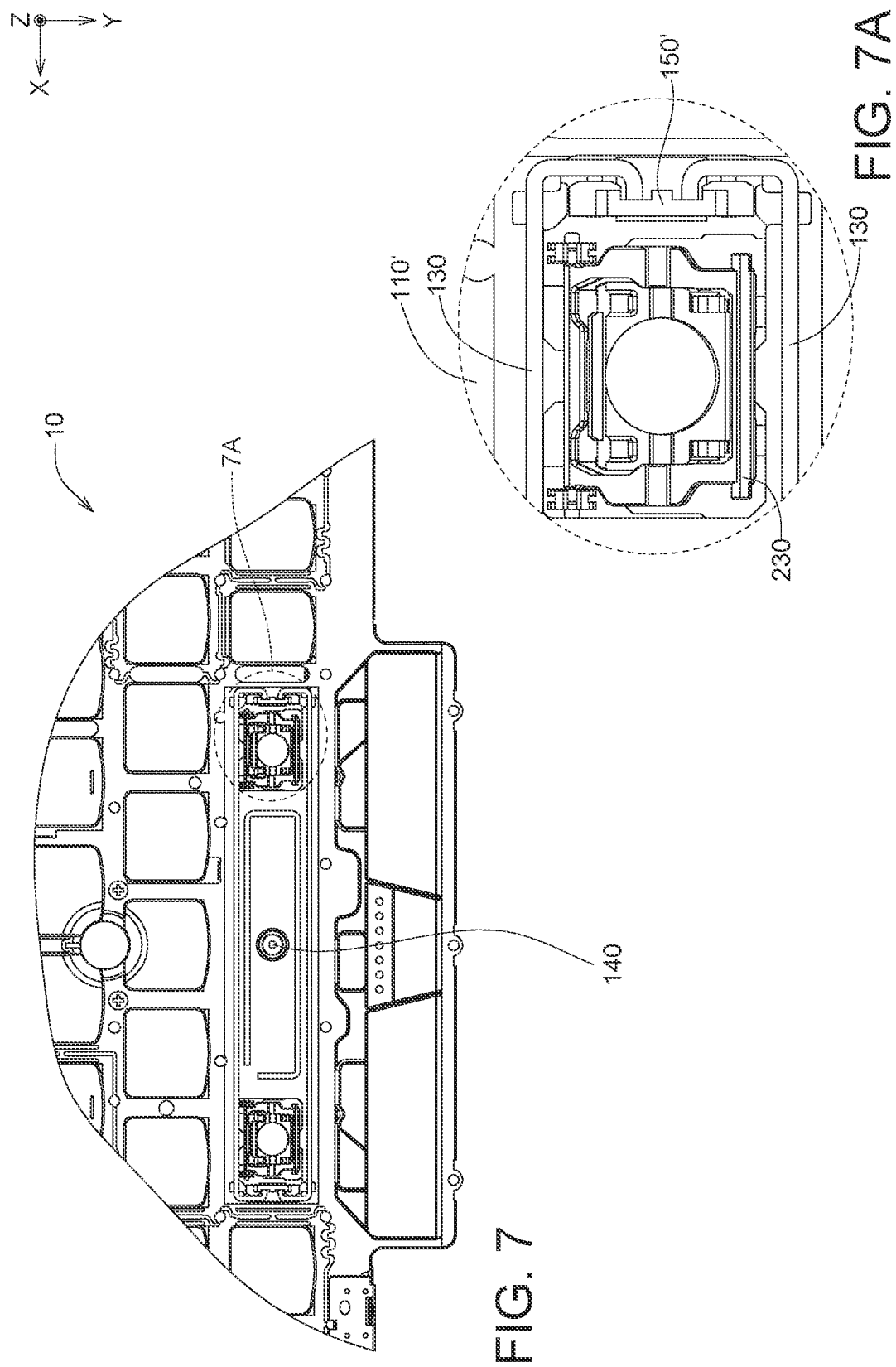
FIG. 7 shows a top view of the base plate, the rods and the positioning element of another key structure of FIG. 1.
Figure 8:
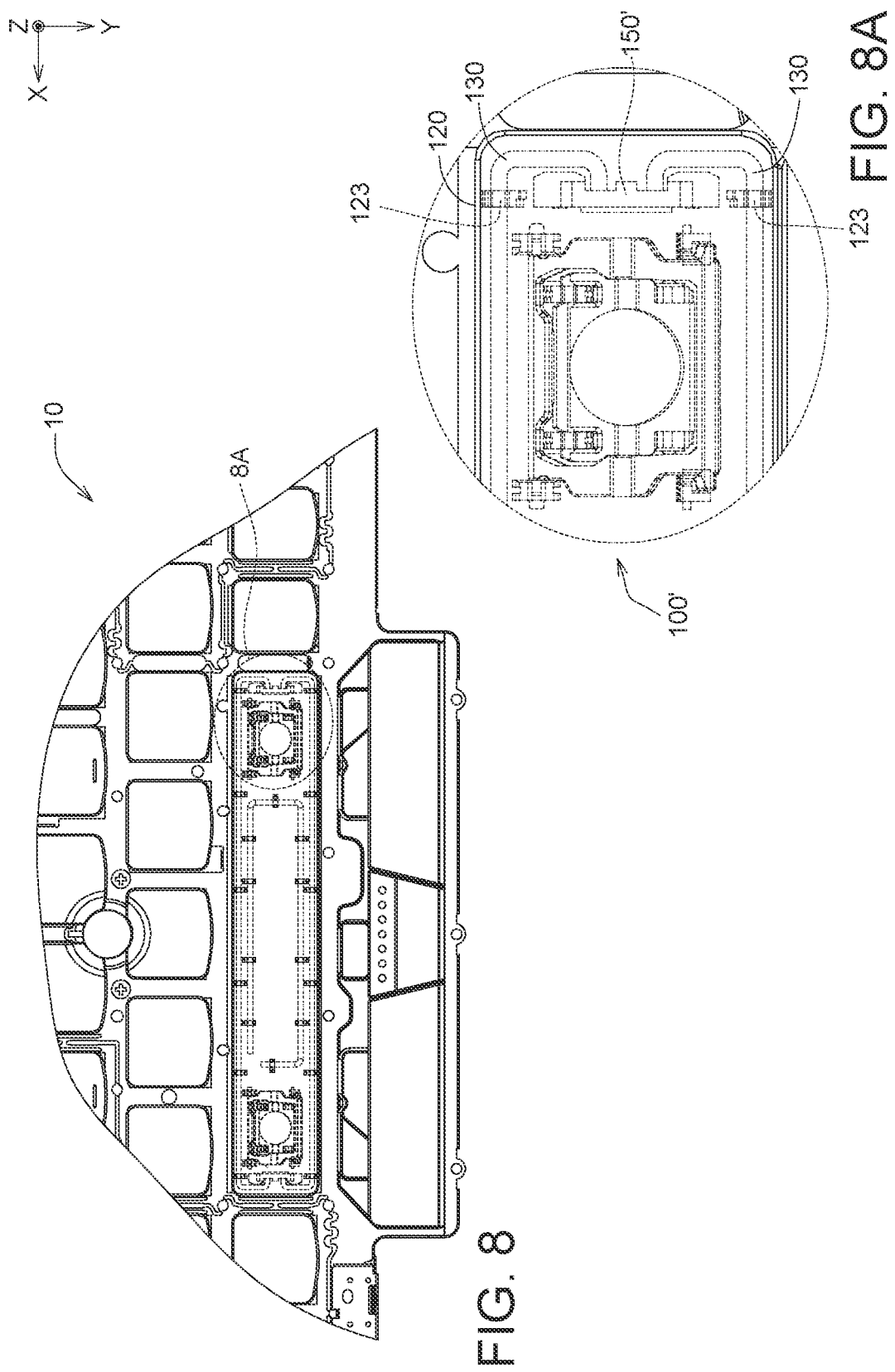
FIG. 8 shows a partial perspective view of the key structure (including the keycap) of FIG. 7.

FIG. 7 shows a top view of the base plate, the rods and the positioning element of another key structure 100' of FIG. 1, FIG. 7A shows a partial enlarged view of the encircled part 7A of the structure of FIG. 7, FIG. 8 shows a partial perspective view of the key structure 100' (including the keycap 120) of FIG. 7, and FIG. 8A shows a partial enlarged view of the encircled part 8a of the structure of FIG. 8.

The key structure 100' includes a base plate 110', at least one keycap 120, at least one rod 130, at least one lifting mechanism 230, at least one restoration member 140 and at least one positioning element 150'. The key structure 100' has the similar features to those of the aforementioned key structure 100, except that the key structure 100' further includes a lifting mechanism 230 and the structure of the base plate 110' is different from that of the base plate 110. The lifting mechanism 230 is pivotally connected to the keycap 120 and the base plate 110' to move up and down with the keycap 120.

The key structure 100' could be one of the keys of a keyboard module 11 of the electronic device 10. The key structure 100' is, for example, a long key of the keyboard module 11, such as a multiple-width key with a keycap having the length greater than its width. Specifically, the key structure 100' is, for example, a space bar or other multiple-width keys (e.g., a "shift" key) of the keyboard module 11. In another embodiment, the key structure 100' could also be used as a standard key (e.g., a letter key) of the keyboard module 11.

Figure 9:
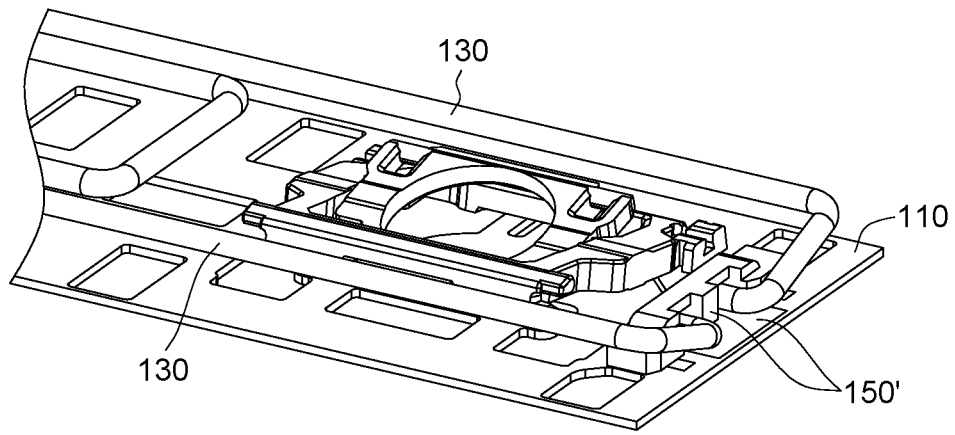
FIG. 9 shows a three-dimensional schematic view of the base plate, the rod and the positioning element of FIG. 7.
Figure 10:
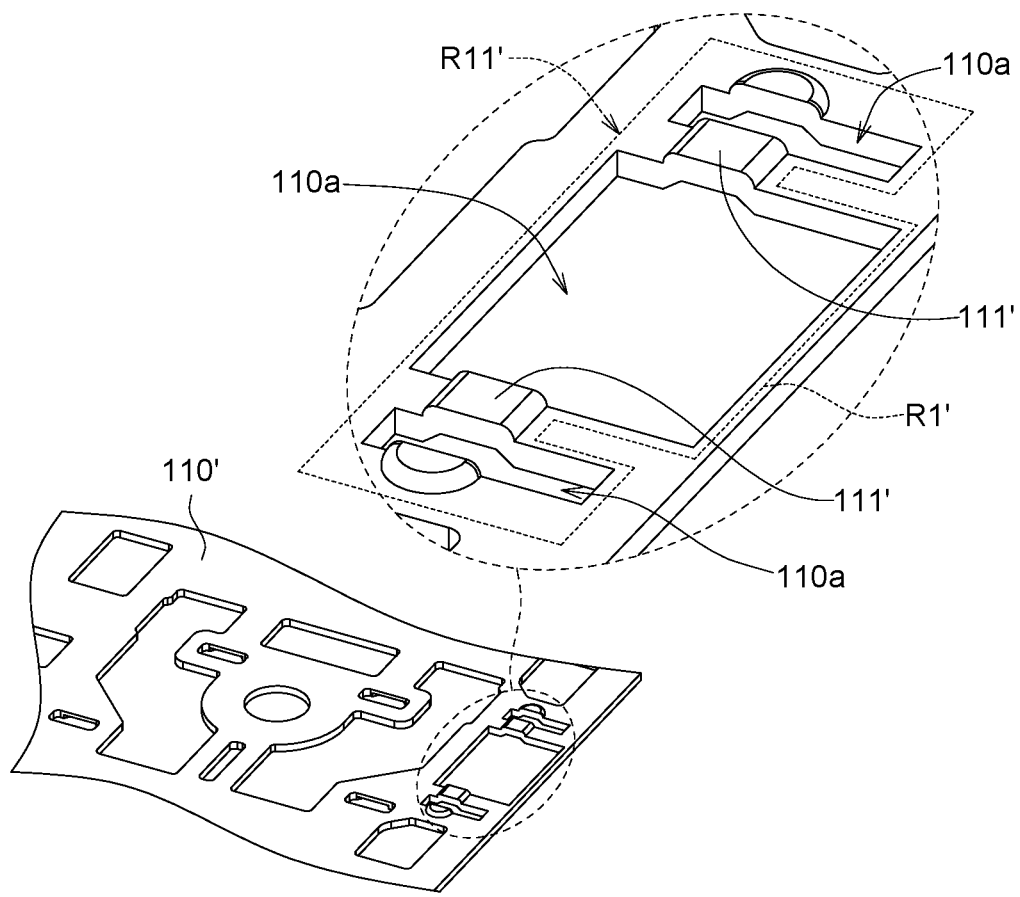
FIG. 10 shows a schematic view of the base plate of FIG. 9.

FIG. 9 shows a three-dimensional schematic view of the base plate 110', the rod 130 and the positioning element 150' of FIG. 7. FIG. 10 shows a schematic view of the base plate 110' of FIG. 9. As shown in FIGS. 9 and 10, the base plate 110' of the key structure 100' includes at least one engagement interface R1' and at least one first position-limited portion 111', wherein the engagement interface R1 is the region which is covered by the positioning element 150', the first position-limited portion 111' could extend from a first edge R11' of the engagement interface R1' toward a middle portion of the engagement interface R1'. The first edge R11' could be one of several edges of the engagement interface R1'. In the present embodiment, the first position-limited portion 111' connects two adjacent through holes 110a, such as a rib. As a result, by filling the through hole 110a with the positioning element 150' and covering the first position-limited portion 111', a bonding area between the positioning element 150' and the base plate 110 could be increased, thereby enhancing bonding strength between the positioning element 150' and the base plate 110 to avoid relative displacement.

In summary, the key structure of the embodiment of the present invention includes a positioning element, and a projected area of the positioning element on a base plate along a lifting direction of a keycap is larger than an area of a through hole, and thus bonding strength of the positioning element and the base plate could be increased. In another embodiment, the base plate of the key structure includes an engagement interface and a first position-limited portion, and the positioning element of the key structure is engaged with the engagement interface. Due to the first position-limited portion extends from an edge of the engagement interface toward a middle portion of the engagement interface, thereby increasing the bonding strength of the positioning element and the base plate.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A key structure, comprises:
    a base plate having a through hole, wherein the through hole is provided with a first edge and a second edge corresponding to two opposite peripheries of the through hole;
    a keycap, disposed on the base plate;
    a restoration member, disposed between the base plate and the keycap;
    a positioning element engaged with the through hole; and
    a rod movably connecting the positioning element and the keycap, wherein the keycap is adapted to move in a lifting direction relative to the base plate;
    wherein the base plate comprises a first position-limited portion comprising a first rib extending from the first edge towards the second edge and a second rib extending from the second edge, and
    wherein the positioning element covers upper surfaces and lower surfaces of the first rib and the second rib, and the upper surfaces of the first rib and the second rib do not protrude from an upper surface of the base plate toward the keycap.

2. The key structure as claimed in claim 1, wherein the base plate has a recess downward extending to the first position-limited portion, and the through hole penetrates the first position-limited portion.

3. The key structure as claimed in claim 2, wherein the positioning element fills the recess and covers the bottom of the recess.

4. The key structure as claimed in claim 2, wherein the positioning element comprises:
    a base, wherein at least one portion of the base fills the recess; and
    a positioning part being connected to the base and protruding above the upper surface of the base plate;
    wherein the base and the positioning part are integrally formed in one piece.

5. The key structure as claimed in claim 4, wherein the base has a first upper surface, the base plate has a second upper surface, and the first upper surface is not lower than the second upper surface.

6. The key structure as claimed in claim 1 wherein the base plate has a plurality of through holes, and the positioning element connects the through holes.

7. The key structure as claimed in claim 6, wherein the through holes are formed in the first position-limited portion, and the positioning element fills the through holes and covers at least one portion of the first position-limited portion.

8. The key structure as claimed in claim 1, wherein a gap is disposed between the first rib and the second rib.

9. The key structure as claimed in claim 1, wherein the first rib extends to the second rib, and the first rib and the second rib are connected to each other.

10. The key structure as claimed in claim 1, wherein the first rib is clamped by the positioning element in a direction parallel to the lifting direction.

11. A key structure, comprises:
a base plate comprising an engagement interface and a first position-limited portion, wherein the first position-limited portion extends from a first edge of the engagement interface toward a second edge of the engagement interface opposite to the first edge;
a keycap disposed on the base plate;
a restoration member, disposed between the base plate and the keycap;
at least one positioning element engaged with the engagement interface; and
a rod connecting the at least one positioning element and the keycap,
wherein the at least one positioning element covers two opposite surfaces of the first position-limited portion and covers a portion of a bottom surface of the base plate adjacent to the second edge, so that an elongated portion of the at least one positioning element has a bottom surface lower than the bottom surface of the base plate at a position corresponding to the second edge.

12. The key structure as claimed in claim 11, wherein the base plate further comprises a second position-limited portion, the second position-limited portion is a notch extending from the second edge of the engagement interface away from a middle portion of the engagement interface, and the at least one positioning element fills the second position-limited portion.

13. The key structure as claimed in claim 11, wherein the first position-limited portion is a rib protruding from the first edge.

14. The key structure as claimed in claim 11, wherein the first position-limited portion and the first edge of the engagement interface are located on different horizontal planes.

15. The key structure as claimed in claim 11, wherein the base plate has a mounting area and a peripheral area, the mounting area protrudes from an upper surface of the peripheral area, the keycap is located on the mounting area, the at least one positioning element is fixed to the mounting area, and a bottom of the at least one positioning element is substantially aligned with a lower surface of the peripheral area or protrudes relative to the lower surface of the peripheral area.

16. The key structure as claimed in claim 11, wherein the keycap is located between a keyboard module and a pointing module, and the keyboard module and the key structure are arranged on the base plate.

17. The key structure as claimed in claim 11, wherein the restoration member is located between two positioning elements.

18. A key structure, comprises:
a base plate comprising an engagement interface and a first position-limited portion, wherein the first position-limited portion extends from a first edge of the engagement interface toward an opposite second edge of the engagement interface;
a keycap disposed on the base plate;
a positioning element engaged with the engagement interface, wherein a portion of an upper surface and a portion of a lower surface of the base plate clamped by the positioning element at a position corresponding to the second edge and in a direction parallel to a lifting direction of the keycap; and
a connecting structure disposed between the base plate and the keycap, wherein a side of the connecting structure is coupled to the positioning element,
wherein a distance between an upper surface of the first position-limited portion and a top of the positioning element is not less than a distance between the upper surface of the base plate and the top of the positioning element.

19. The key structure as claimed in claim 18, wherein the first position-limited portion is a rib protruding from the first edge with a gap between one end thereof and the second edge.

20. The key structure as claimed in claim 18, wherein the base plate comprises at least two through holes, and the first position-limited portion connects two adjacent through holes.

21. The key structure as claimed in claim 18, wherein the positioning element comprises a positioning hole with an opening not facing the keycap, and the side of the connecting structure is disposed in the positioning hole.

22. The key structure as claimed in claim 18, wherein the positioning element comprises a first part and a second part respectively below and above the lower surface of the base plate, and a thickness of the first part is less than a thickness of the second part.

* * * * *